3,420,154
EASILY LOADED CAMERA WITH
OPEN ENDED SPOOL
Ernst Lieser, Horst Simon, and Edwin Mueller, Stuttgart-Wangen, Germany, assignors to Eastman Kodak Company, Rochester, N.Y., a corporation of New Jersey
Filed Aug. 27, 1965, Ser. No. 505,299
Claims priority, application Germany, Aug. 27, 1964,
K 53,849
U.S. Cl. 95—31       13 Claims
Int. Cl. G03b *19/04*

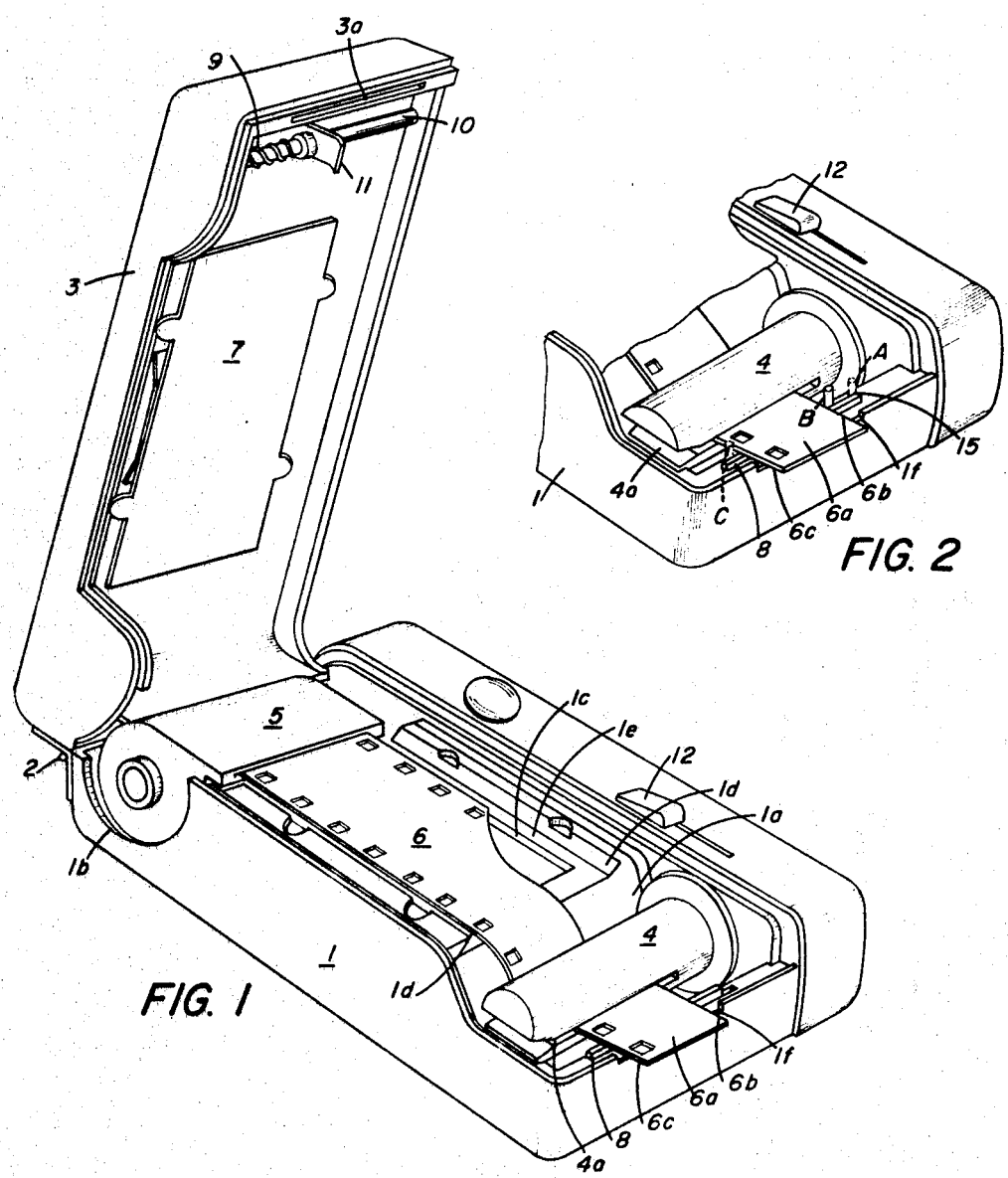

ABSTRACT OF THE DISCLOSURE

In a photographic camera for use with film in rolls, cartridges or cassettes, the take-up spool is furcated to form a transverse slot extending parallel to the axis of rotation to allow edgewise insertion of the film leader. A slidable member impinges on the film leader to properly align the film and gauge the film width, thereby transmitting information concerning the characteristics of the film.

---

The invention relates to a photographic camera for use with films supplied in rolls, films in cartridges or cassettes, respectively, with or without spool, and particularly to the manner of loading film in the camera and preparing the camera for operation.

In most known cameras the film leader must be manually fastened to the take-up spool, either before or after insertion of the film into the camera. This process is troublesome and requires a certain amount of manual dexterity. In order to avoid this shortcoming, film magazines were created having film supply and take-up chambers joined by means of connecting portions and wherein the film supply chamber contains the preloaded film and the exposed film is fed into the film take-up chamber. The use of these film magazines is limited, however, to certain camera models which are designed specifically for this purpose. The same holds true for the employment of a spoolless film cassette from which film is drawn and fed by pushing into a similar spoolless film cassette.

One of the objects of the invention is to simplify the insertion and attachment of conventional films in cameras when preparing the cameras for operation. In photographic cameras adapted for the use of films supplied in rolls, whether with or without spools, this object is accomplished according to the invention by inserting the film leader edgewise into the take-up spool rather than threading it through endwise, as is the arrangement in cameras of the prior art. Preferably, the leader of the film will project beyond the core of the take-up spool, as it is being inserted into the take-up spool and will also project beyond the spool chamber which is to house the exposed film, with the result that the projecting portion is drawn into the camera housing and wound around the core of the take-up spool along with the film when the film transport mechanism is operated. By suitably designing both the take-up spool and the camera housing in accordance with the invention, the insertion and attachment of film is simplified so that the camera is substantially as easy to load as those cameras which are designed especially for use with film magazines.

Other objects of the invention will become evident from the description which follows, including reference to the accompanying drawings in which:

FIG. 1 illustrates a perspective view of a photographic camera with a back or cover open, a film leader passing through the slot or opening in the core of the take-up spool with a portion of the leader extending over the slide member disposed in the housing and outside the camera, and the slide member disposed inside the cover for aligning the film leader relative to the opening in the core of the take-up spool;

FIG. 2 is an alternate embodiment illustrating only a fractional portion of a camera with a scanning pin disposed in three operative positions inside the housing, which pin serves to align the film leader relative to the exposure plane framing unit (not shown);

Figure 6:
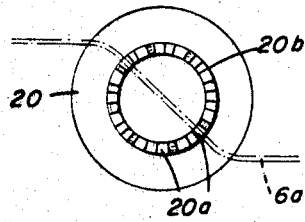
Figure 7:
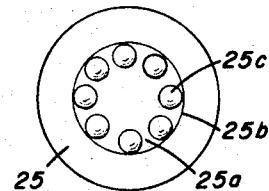

FIG. 6 illustrates another embodiment of a take-up spool having a core provided with a plurality of slots through which the film leader (shown in dash-dotted lines) is inserted for connection to the core of the take-up spool; and FIG. 7 illustrates still another embodiment of the take-up spool having a core provided with a plurality of cylindrical tapered bodies through which the film leader (not shown) is inserted for connection to the core of the take-up spool.

Referring to the drawings, in FIG. 1, the camera back or cover 3 is mounted on housing 1 of the camera so that the back may be pivoted to open or closed position around hinge 2. A take-up spool 4 is disposed within spool chamber 1a and may be permanently or detachably connected to the camera housing 1. A chamber 1b lies at the opposite end of the housing from spool chamber 1a and serves to house a film cassette 5 containing a film 6. It will be appreciated, however, that the film could be provided in a roll within chamber 1b rather than in a cassette, and this would still be within the scope of the invention. In the area of the exposure plane framing unit 1c, which is disposed between the chambers 1a and 1b, the film is guided by beveled surfaces 1d and within the channel formed between the pressure plate 7 and the surface 1e surrounding the exposure plane framing unit 1c and constituting the exposure plane defining means.

Figure 5:
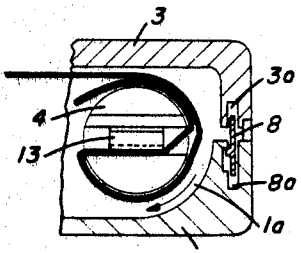
FIG. 5 is a view similar to FIG. 4 and illustrates the film leader wound upon the core of the take-up spool and the slide member extending from the housing and into the recess of the cover to close the spool chamber in a light-tight manner.
Figure 4:
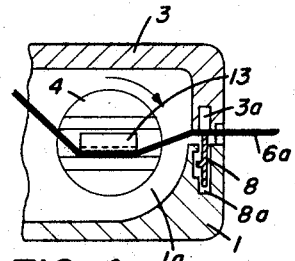
FIG. 4 illustrates a fractional, sectional view of the camera housing with the back or cover closed, and the slide member disposed in the housing of either FIG. 1 or FIG. 2 being held in open position by the film leader passing thereover as it projects outside the housing before the take-up spool is rotated by film advancing mechanism for winding the film on the core of the take-up spool.

A recess 3a is formed within one end of the camera back or cover 3 and is arranged to receive a slide member 8 resiliently mounted in the camera housing 1 in a recess 8a (FIGS. 4 and 5). The resilient means (not shown) associated with the slide member normally urges the slide member into the recess 3a when the camera cover is in closed position unless the leader 6a of the film 6 extends over the slide member and outside the camera housing through guide slot 1f, as illustrated also in FIGS. 2 and 4. The guide slot is in communication with the spool chamber 1a when the slide member is held open by the film leader. The slide member 8 is arranged to close the spool chamber 1a in a light-tight manner when the film leader has been drawn inside the housing by film advancing mechanism and wound around the take-up spool.

The camera back or cover 3 of the embodiment illustrated in FIG. 1 is further provided with a slide member 11 biased by tension spring 9 along axle 10. When the cover is moved to the open position, the slide member 11 is moved along axle 10 into an initial position where it is locked. This may be accomplished manually when the camera back 3 is open, or automatically as a function of the opening movement of the camera back. When the camera back is closed, the slide member, which may be released by the operation of the cover moving to closed position, contacts the edge 6b of film leader 6a of the film 6 and thus pushes the edge 6c against a stop (not shown) disposed within the camera housing 1 or on the take-up spool 4.

The slide member 11, in engaging film edge 6b, serves to register or align the film edge 6c with the stop, as previously mentioned, and which alignment places the film in proper position for passing over the exposure plane framing unit 1c. The slide member 11 may also be connected to an exposure measuring and/or control device, such as disclosed in the Bundschuh et al. Patent No. 3,125,939, issued Mar. 24, 1964, so as to scan the width of the film such as disclosed in the copending Nagel U.S. patent application Ser. No. 259,054, filed Feb. 18, 1963, and thereby provide an input of the film sensitivity and/or type of film into the camera.

The insertion of the film and the operation of the camera are effected as follows:

A film cassette 5, containing film 6, is placed into chamber 1b of the camera housing 1 when the camera back or cover 3 is open. The leader 6a of the film 6 is manually grasped and drawn out from the cassette and inserted into the slot 4a of the take-up spool by an edgewise sliding movement into the slanted open end thereof. The sliding insertion of the film leader is made possible by designing the wall of the housing in the area of the spool chamber with a cut-away portion adjacent the one end of the core of the take-up spool in the manner illustrated in FIG. 1. The end portion of the leader is then placed within the guide slot 1f. The camera back 3 is then closed.

The alignment or registration of the leader 6a of the film 6 to a predetermined position relative to the exposure plane framing unit 1c is effected by the slide member 11. At the same time the film sensitivity of the film may be determined by sensing the width of the film leader by the slide member 11, and fed as an input into the camera in a conventional manner. During the closing process the pressure plate 7 and beveled surfaces 1d serve to guide the film 6, which may be laterally displaced relative to the exposure plane framing unit 1c, into the correct position with respect to the channel extending between the beveled surfaces so that the film may be properly guided across the exposure plane framing unit for sequential exposures.

When the handle 12 is operated to effect the film advancing and shutter cocking operation, the take-up spool 4 is turned in clockwise direction (FIGS. 4 and 5) and the leader 6a of the film is drawn on into camera housing 1 and wound around the core of the take-up spool along with the film 6. Part of the leader remaining inside the housing is wound partially around the core of the take-up spool as the leader portion projecting outside the housing is being drawn inside the housing. In other words, any possiblity of the leader being pulled out of the slot in the core of the take-up spool, when the film advancing mechanism is operated, is obviated when the spool has rotated part of a full revolution.

Once the slide member 8 is released by the withdrawal of the leader 6a of the film into the housing the slide member can now be received within the recess 3a and thus close the spool chamber in a light-tight manner.

The embodiment illustrated in FIG. 2 differs from FIG. 1 in that a scanning pin 15, shown in positions A, B or C is disposed within the camera housing 1 so that it may be displaced parallel to the axis of the take-up spool 4. When the camera back 3 is opened, the scanning pin 15 is caused to move into position A against the bias of resilient means (not shown) and is arrested in this position. This may be accomplished manually or automatically. When the camera back 3 is closed, the scanning pin is released for movement into engagement with the edge 6b of the film so as to align the edge in a predetermined manner relative to the exposure plane framing unit 1c whereupon the scanning pin is moved to the position B. Thus, the edge 6c of leading edge 6a of the film may either be drawn or pushed toward a stop (not shown), the stop being disposed either in the camera housing 1 or on the take-up spool 4. In this manner a definition of the film edge 6c of the film relative to the slot or opening 4a of the take-up spool core in the camera is achieved.

When the film leader 6a is drawn into the camera housing by the operation of handle 12, the scanning pin can then move to position C. In position C, a film counting mechanism (not shown) may be triggered in a conventional and well-known manner for operation. It is within the scope of the invention to combine the feeding of the film sensitivity or film character into an exposure measuring and/or control device along with the method of defining the position of the leader of the film relative to the exposure plane framing unit, that is, the movement of the scanning pin 15 from the position A to the position B.

Figure 3:
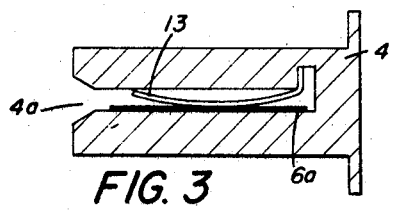
FIG. 3 is a sectional view of the take-up spool along the axial length of its core illustrating the film leader inserted in the slot or opening, and the retaining spring disposed within the opening bearing against the film leader.

Slot 4a in the core of the take-up spool 4, as shown partially in section in FIG. 3, as well as in FIGS. 4 and 5, may be provided with a retaining spring 13. In order to facilitate insertion of the leader 6a of the film, slot 4a is slanted or rounded off at its open front side to a considerable extent. The take-up spool 20, illustrated in FIG. 6, is another embodiment and is provided with several slots 20a. This is similar in effect to the take-up spool 25, still another embodiment which is illustrated in FIG. 7. Either one of the embodiments may be used instead of take-up spool 4. The slots 20a in FIG. 6 are arranged diametrically around the spool and are an integral part of the circumference 20b of the spool core 20. The slots 20a are slanted or rounded off at their front side, somewhat in the manner illustrated in FIG. 3 of take-up spool 4, so as to facilitate the insertion of the leader 6a of the film, as indicated by the dash-dotted lines. The insertion slots 25a in the core 25b of take-up spool 25 (FIG. 7) enable the leader 6a to be inserted in any position of the take-up spool with respect to the camera housing 1 or to the film guide in the area of the exposure plane framing unit 1c, respectively.

In the take-up spool 4, as illustrated in FIGS. 1 to 5, the slot 4a for the insertion of the leader 6a should be a position that is approximately parallel to the film guide or channel in the area of the exposure plane framing unit 1c between beveled surfaces 1d. The insertion slot 4a is automatically moved into this position by the film 6 when the film is rewound. As a matter of expediency, the take-up spool 4 may be arrested in this position by means provided in the camera. For instance, it might be controlled by the opening movement of camera back 3. This could be achieved, for example, by a detent arrangement which is disengaged again when the camera back 3 is closed or when the leader 6a is inserted into the take-up spool 4. The use of a detent would have the advantage that even when the slot 4a is in a position which is unfavorable for insertion of the film, the position of the slot 4a with respect to the camera could be corrected by turning the take-up spool 4 while the camera back 3 is open. For improving the insertion and winding operation, the core of the take-up spool is provided with a larger diameter than the core of the usual take-up spools.

The invention has been described in detail with particular reference to preferred embodiments thereof, but it will be understood that variations and modifications can be effected within the spirit and scope of the inven-

We claim:

1. In a camera having a housing, said housing having exposure plane framing means, wall means defining a pair of film chambers which are located on opposite sides of said framing means for receiving, respectively, (a) a roll of film provided with a leader extending from the roll and (b) a take-up spool, and means for advancing said film across said exposure plane framing means for winding said film upon said take-up spool, the improvement comprising:

said take-up spool being furcated to form slot means extending transversely along the spool and at least a major portion of which slot means lies generally parallel to the axis of rotation of said spool;

one axial end of said slot means opening to the exterior of said spool at a location thereon such that said leader may be positively engaged with said spool by moving said leader edgewise into said slot means in a direction generally axially of said spool;

and said housing adjacent said take-up chamber having a guide slot formed therein which is in communication with said take-up chamber and through which guide slot is positioned any portion of said leader thus engaged extending outside said housing, the extending portion being drawn through the guide slot into the housing upon initial film advance.

2. In a camera having a housing, said housing having exposure plane framing means and wall means defining a pair of film chambers which are located on opposite sides of said framing means for receiving, respectively, (a) a roll of film provided with a leader extending from the roll and (b) a take-up spool; the improvement comprising:

said take-up spool being furcated to form slot means extending transversely along the spool and at least a major portion of which slot means lies generally parallel to the axis of rotation of said spool;

one axial end of said slot means opening to the exterior of said spool at a location thereon such that said leader may be positively engaged with said spool by moving said leader edgewise into said slot means in a direction generally axially of said spool with a portion of the leader extending beyond said spool;

and means mounted for movement relative to said take-up chamber and operative upon such movement to engage and move, in an edgewise direction to a predetermined position, the extending portion of said leader to properly align the film with said exposure plane framing means.

3. The invention according to claim 1, said camera housing further including means extending transversely of said leader and arranged (a) to be held in an open position by said portion of said leader extending thereover and outside said housing and (b) to close said take-up chamber in light-tight manner when said portion of said leader has been withdrawn into said housing by being wound upon said take-up spool along with said film.

4. The invention according to claim 3, said camera further having a cover member for said take-up chamber, said cover member being provided with a recess at one end:

and said last-named means comprising a member slidably disposed within a recess in said housing and normally biased for engagement with said recess in said cover member for closing said take-up chamber in light-tight manner.

5. The invention according to claim 2, said camera further having a cover member and wherein said means mounted for movement relative to said take-up chamber comprises a slide member disposed within said cover member opposite said take-up chamber.

6. The invention according to claim 5, wherein said slide member after moving said portion of said leader in said edgewise direction to said predetermined position scans the width of said leader so as to provide an input of information concerning the film into the camera.

7. The invention according to claim 2, wherein said means mounted for movement relative to said take-up chamber comprises a slide member disposed within said take-up chamber to one side of said spool for movement in a direction parallel to the axis of said spool.

8. The invention according to claim 7, wherein said slide member after moving said portion of said leader in said edgewise direction to said predetermined position scans the width of said leader so as to provide an input of information concerning the film into the camera.

9. The invention according to claim 1, said wall means adjacent one end of said take-up spool chamber having a portion which is cut-away, and said opening of said slot means being at one end of said spool adjacent said cut-away portion for facilitating said movement of the leader edgewise into said slot means.

10. The invention according to claim 2, said wall means adjacent one end of said take-up spool chamber having a portion which is cut-away, and said opening of said slot means being at one end of said spool adjacent said cut-away portion for facilitating said movement of the leader edgewise into said slot means.

11. The invention according to claim 9, wherein said slot means comprises a plurality of passages having corresponding openings, any passage of which may be aligned with said cut-away portion in said wall means by rotating said take-up spool so that said leader may be inserted into said aligned passage by said edgewise movement.

12. The invention according to claim 10, wherein said slot means comprises a plurality of passages having corresponding openings, any passage of which may be aligned with said cut-away portion in said wall means by rotating said take-up spool so that said leader may be inserted into said aligned passage by said edgewise movement.

13. The invention according to claim 1, said camera further including means mounted for movement relative to said take-up chamber and operative upon such movement to engage and move in an edgewise direction to a predetermined position that portion of said leader thus engaged with said slot means which extends beyond said spool so as to properly align said leader with said exposure plane framing means.

References Cited

UNITED STATES PATENTS

| | | | |
|---|---|---|---|
| 2,554,333 | 5/1951 | Kaplowitz | 95—31 |
| 3,165,990 | 1/1965 | Kiper et al. | 95—10 |
| 3,236,474 | 2/1966 | Day | 242—74 |

NORTON ANSHER, *Primary Examiner.*

R. A. SCHROEDER, *Assistant Examiner.*

U.S. Cl. X.R.

242—74; 95—10